United States Patent
Schumacher

(10) Patent No.: US 7,461,562 B2
(45) Date of Patent: Dec. 9, 2008

(54) PROCESS DEVICE WITH DENSITY MEASUREMENT

(75) Inventor: Mark S. Schumacher, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 4 days.

(21) Appl. No.: 11/511,584

(22) Filed: Aug. 29, 2006

(65) Prior Publication Data

US 2008/0053242 A1 Mar. 6, 2008

(51) Int. Cl.
*G01F 1/34* (2006.01)
(52) U.S. Cl. .................................................. 73/861.42
(58) Field of Classification Search ................... 73/705, 73/745, 861.42; 702/138; 392/441
See application file for complete search history.

(56) References Cited

U.S. PATENT DOCUMENTS

| | | | |
|---|---|---|---|
| 817,470 A | 4/1906 | Cole | |
| 1,093,229 A | 4/1914 | Wilkinson | |
| 1,809,376 A | 6/1931 | Cole | |
| 3,564,912 A | 2/1971 | Malone et al. | 73/194 |
| 3,701,280 A | 10/1972 | Stroman | 73/194 |
| 3,751,982 A | 8/1973 | Lambert | 73/212 |
| 3,765,241 A | 10/1973 | Lambert | 63/212 |
| 4,103,551 A | 8/1978 | Lynnworth | 73/194 |
| 4,154,100 A | 5/1979 | Harbaugh et al. | 73/212 |
| 4,238,825 A | 12/1980 | Geery | 364/510 |
| 4,249,164 A | 2/1981 | Tivy | 340/870.3 |
| 4,320,665 A | 3/1982 | Cain | 73/861.04 |
| 4,403,296 A | 9/1983 | Prosky | 364/573 |
| 4,414,634 A | 11/1983 | Louis et al. | 364/510 |
| 4,419,898 A | 12/1983 | Zanker et al. | 73/861.02 |
| 4,425,807 A | 1/1984 | Victor | 73/861.65 |
| 4,437,164 A | 3/1984 | Branch, III | 364/571 |
| 4,446,730 A | 5/1984 | Smith | 73/301 |
| 4,485,673 A | 12/1984 | Stern | 73/304 |
| 4,528,855 A | 7/1985 | Singh | 73/721 |
| 4,559,835 A | 12/1985 | DeBaun | 73/861.66 |
| 4,559,836 A | 12/1985 | Coleman et al. | 73/861.66 |

(Continued)

FOREIGN PATENT DOCUMENTS

DE 91 09 176.4 10/1991

(Continued)

OTHER PUBLICATIONS

"Fundamentals of Flow Metering", *Technical Data Sheet 3031*, Rosemount Inc. Eden Prairie, MN, 1982, pp. 1-7.
"Generalized Flow Across an Abrupt Enlargement", *Journal of Engineering for Power*, by R. P. Benedict et al., Jul. 1976, pp. 327-334.
"Model 2024 Differential Pressure Transmitter", by Rosemount Inc., Eden Prairie, MN, Sep. 1993, pp. 2-8.

(Continued)

*Primary Examiner*—Jewel Thompson
(74) *Attorney, Agent, or Firm*—Westman, Champlin & Kelly, P.A.

(57) ABSTRACT

A process variable transmitter for measuring a process variable of a process fluid in a vessel includes first and second pressure couplings arranged to receive a first pressure and a second pressure of process fluid in the vessel. These pressures are related to the density of the process fluid. A sensor provides a sensor output related to the process fluid in the vessel. Measurement circuitry is configured to calculate a calculated process variable of the process fluid in the vessel based upon the first and second pressures and the sensed process variable.

24 Claims, 7 Drawing Sheets

U.S. PATENT DOCUMENTS

| | | | |
|---|---|---|---|
| 4,562,744 A | 1/1986 | Hall et al. | 73/861.02 |
| 4,592,239 A | 6/1986 | Cutler | 73/861.66 |
| 4,598,381 A | 7/1986 | Cucci | 364/558 |
| 4,602,344 A | 7/1986 | Ferretti et al. | 364/509 |
| 4,677,841 A | 7/1987 | Kennedy | 73/30 |
| 4,717,159 A | 1/1988 | Alston et al. | 277/1 |
| 4,754,651 A | 7/1988 | Shortridge et al. | 73/861.42 |
| 4,768,386 A | 9/1988 | Taddeo | 73/861.66 |
| 4,796,651 A | 1/1989 | Ginn et al. | 137/8 |
| 4,799,169 A | 1/1989 | Mims | 364/510 |
| 4,823,615 A | 4/1989 | Taha | 73/861.66 |
| 4,825,704 A | 5/1989 | Aoshima et al. | 73/861.42 |
| 4,864,462 A | 9/1989 | Madou et al. | 361/280 |
| 4,881,412 A | 11/1989 | Northedge | 73/861.04 |
| 4,958,938 A | 9/1990 | Schwartz et al. | 374/208 |
| 4,986,127 A | 1/1991 | Shimada et al. | 73/714 |
| 5,035,140 A | 7/1991 | Daniels et al. | 73/290 |
| 5,058,437 A | 10/1991 | Chaumont et al. | 73/861.21 |
| 5,313,980 A | 5/1994 | Carlson | 137/557 |
| 5,317,948 A * | 6/1994 | Blaha | 73/701 |
| 5,365,795 A | 11/1994 | Brower, Jr. | 73/861.65 |
| 5,495,769 A | 3/1996 | Broden et al. | 73/718 |
| 5,606,513 A * | 2/1997 | Louwagie et al. | 702/138 |
| 5,772,323 A | 6/1998 | Felice | 374/127 |
| 5,857,777 A | 1/1999 | Schuh | 374/172 |
| 5,949,695 A | 9/1999 | Snell | 708/290 |
| 6,182,019 B1 * | 1/2001 | Wiklund | 702/100 |
| 7,221,281 B1 * | 5/2007 | Young | 340/606 |
| 7,228,066 B2 * | 6/2007 | Pope | 392/441 |
| 2003/0226395 A1 * | 12/2003 | Storm et al. | 73/32 R |

FOREIGN PATENT DOCUMENTS

| | | |
|---|---|---|
| EP | 0 063 685 | 11/1982 |
| EP | 0 214 801 | 3/1987 |
| EP | 0 223 300 | 5/1987 |
| WO | WO 88/01417 | 2/1988 |
| WO | WO 89/02578 | 3/1989 |
| WO | WO 98/04089 | 5/1989 |
| WO | WO 90/15975 | 12/1990 |
| WO | WO/91/18266 | 11/1991 |

OTHER PUBLICATIONS

"Model 3051C Differential Pressure Transmitter", by Rosemount Inc., Eden Prairie, MN, 1991, pp. 2-12.

"Pressure Fundamentals & Transmitter Selection", *Application Data Sheet 3015*, by Rosemount Inc., Eden Prairie, MN, pp. 1-10.

"Probe Blockage Effects in Free Jets and Closed Tunnels", *Journal of Engineering for Power*, by J.S. Wyler, Oct. 1975, pp. 509-515.

Product Data Sheet PDS 4015, "Model 3095FT Flow Transmitter", by Rosemount Inc., Eden Prairie, MN, Feb. 1994.

Brochure: "Reduce Unaccounted-For Natural Gas with High-Accuracy Pressure Transmitters", Rosemount Inc., Measurement Division, Eden Prairie, MN, ADS 3073, May 1991, pp. 1-4.

Technical Information Bulletin, "Liquid Level Transmitter Model DB40RL Sanitary Sensor deltapilot", Endress+Hauser, Greenwood, IN, Sep. 1992, pp. 1-8.

"The Digitisation of Field Instrucments", W. Van Der Bijl, *Journal A*, vol. 32, No. 3, 1991, pp. 62-65.

"Numerical Recipes in Fortran", by W. Press et al., Cambridge University Press, 1992, pp. 650-651 and 664-665.

"Orifice Metering Of Natural Gas and Other Related Hydrocarbon Fluid", Part 1, General Equations and Uncertainty Guidlines, American Gas Association, Report No. 3, American Petroleum Institute, API 14.3, Gas Processors Association, GPA 8185-90, Third Edition, Oct. 1990, A.G.A. Catalog No. XQ9017.

"Orifice Metering Of Natural Gas and Other Related Hydrocarbon Fluid", Part 2, Specification and Installation Requirements, American Gas Association, Report No. 3, American Petroleum Institute, API 14.3, Gas Processors Association, GPA 8185-90, Third Edition, Feb. 1991, A.G.A. Catalog No. XQ9104.

"Orifice Metering Of Natural Gas and Other Related Hydrocarbon Fluid", Part 3, Natural Gas Applications, American Gas Association, Report No. 3, American Petroleum Institute, API 14.3, Gas Processors Association, GPA 8185-92, Third Edition, Aug. 1992, A.G.A. Catalog No. XQ9210.

"Orifice Metering Of Natural Gas and Other Related Hydrocarbon Fluid", Part 4, Background, Development, Implementation Procedure, and Subroutine Documentation for Empirical Flange-Tapped Discharge Coefficient Equation, American Gas Association, Report No. 3, American Petroleum Institute, API 14.3, Gas Processors Association, GPA 8185-92, Third Edition, Oct. 1992, 2nd Printing Aug. 1995, A.G.A. Catalog No. XQ9211.

"Compressibility Factors of Natural Gas and Other Related Hydrocarbon Gases", AGA Transmission Measurement Committee Report No. 8, American Petroleum Institute MPMS Chapter 14.2, Gas Research Institute, Catalog No. XQ9212, Second Edition, Nov. 1992, 2nd Printing Jul. 1994.

"Model 3095 Flow Transmitter", Preliminary Product Information, Sep. 1993, Rosemount Inc., Eden Prairie, MN.

"Signal Transmission Put on a Pedestal", *Control and Instrumentation*, Sep. 1976, vol. 6, No. 8, pp. 28-29.

Specification Summary, "Teletrans™ 3508-30A Smart Differential Pressure Transmitter", (undated) Bristol Badcock, Inc., Watertown, CT.

Notification of Transmittal of the International Search Report for PCT/US96/20898 with international filing date Dec. 31, 1996, 7 pages.

"Single Chip Senses Pressure and Temperature", *Machine Design*, 64 (1992) May 21, No. 10.

Specification Summary, "Teletrans™ 3508-10A Smart Differential Pressure Transmitter", (undated) Bristol Badcock, Inc., Watertown, CT.

Specification Summary, "AccuRate Advanced Gas Flow Computer, Model GFC 3308", (undated) Bristol Badcock, Inc., Watertown, CT.

Product Data Sheet 4640, "Model 3201 Hydrostatic Interface Unit", Mar. 1992, Rosemount Inc., Eden Prairie, MN.

Product Data Sheet 4638, "Model 3001CL Flush-Mount Hydrostatic Pressure Transmitter", Jul. 1992, Rosemount Inc., Eden Prairie, MN.

"Precise Computerized In-Line Compressible Flow Metering", *Flow-Its Measurement and Control in Science and Industry*, vol. 1, Part 2, Edited by R. Wendt, Jr., published by American Institute of Physics et al., (undated), pp. 539-540.

"Flow Measurement", *Handbook of Fluid Dynamics*, V. Streeter, Editor-in-Chief, published by McGraw-Hill Book Company, Inc., 1961, pp. 14-4 to 14-15.

"Methods for Volume Measurement Using Tank-Gauging Devices Can Be Error Prone", F. Berto, *The Advantages of Hydrostatic Tank Gauging Systems*, undated reprint from *Oil and Gas Journal*.

"Hydrostatic Tank Gauging—Technology Whose Time Has Come", J. Berto, *Rosemount Measurement Division Product Feature*, undated reprint from *Intech*.

"Pressure Sensors Guage Tank Level and Fluid Density", *Rosemount Measurement Division Product Feature*, undated reprint from *Prepared Foods*, (Copyrighted 1991 by Gorman Publishing Company).

"A Systems Approach", by Dr. C. Ikoku, *Natural Gas Engineering*, 2 pgs. Undated.

"Low Cost Electronic Flow Measurement System", *Tech Profile*, May 1993, Gas Research Institute, Chicago, IL.

"Development of an Integrated EFM Device for Orifice Meter Custody Transfer Applications", S.D. Nieberle et al., *American Gas Association Distribution/Transmission Conference & Exhibit*, May 1993.

Advertisement, AccuRate Model 3308 Integral Smart DP/P/T Transmitter, undated, Bristol Babcock, Inc., Watertown, CT.

"Smart Transmitters Tear Up the Market", C. Polsonetti, *Intech*, Jul. 1993, pp. 42-45.

"Numerical Recipes in C", by W. Press et al., Cambridge University Press, 1990, pp. 51-59 and 158-162.

Written Opinion for PCT/US00/25923, filed Sep. 22, 2000, 8 pages.

* cited by examiner

PROCESS DEVICE WITH DENSITY MEASUREMENT

BACKGROUND OF THE INVENTION

The present invention relates to industrial process control and monitoring systems in the measurement of process variables and such systems. More specifically, the present invention relates to measurement of process variables to process fluid related to density of the fluid.

Industrial processes are used to monitor and/or control operation of industrial processes. For example, process variable transmitters are used to measure process variables of the industrial process. Examples of process variables include temperature, pressure, level and flow. Level of fluid in a tank of flow of a process fluid through a pipe, such as mass flow, are typically not measured directly but are calculated from a number of process variables.

For example, in industrial processes, transmitters which measure flow rate (Q) are placed at remote locations in the field of a process control system. These transmitters transmit flow rate information to a control room. The flow rate information is used to control operation of the process. As used herein, process fluid refers to both liquid and gaseous fluids.

One common means of measuring flow rate in the process control industry is to measure the pressure drop across a fixed restriction in the pipe, often referred to as a differential producer or primary element. The general equation for calculating flow rate through a differential producer can be written as:

$$Q = NC_d EY_1 d^2 \sqrt{\rho h} \qquad \text{Equation 1}$$

Where:
Q=Mass flow rate (mass/unit time)
N=Units conversion factor (units vary)
$C_d$=Discharge coefficient (dimensionless)
E=Velocity of approach factor (dimensionless)
$Y_1$=Gas expansion factor (dimensionless)
d=Bore of differential producer (length)
$\rho$=Fluid density (mass/unit volume)
h=Differential pressure (force/unit area)

Of the terms in this expression, only the units conversion factor, which is a constant, is simple to calculate. The other terms are expressed by equations that range from relatively simple to very complex. Some of the expressions contain many terms and require the raising of numbers to non-integer powers. This is a computationally intensive operation.

There are a number of types of meters which can be used to measure flow. Head meters are the most common type of meter used to measure fluid flow rates. They measure fluid flow indirectly by creating and measuring a differential pressure by means of an obstruction to the fluid flow. Using well-established conversion coefficients which depend on the type of head meter used and the diameter of the pipe, a measurement of the differential pressure may be translated into a mass or volume rate.

One technique for measuring a differential pressure for determining flow is through an averaging pitot tube type primary element. In general, an averaging pitot tube type primary element for indicating flow consists of two hollow tubes that sense the pressure at different places within the pipe. These tubes can be mounted separately in the pipe or installed together in one casing as a single device. An example of an averaging pitot tube is shown in U.S. Pat. No. 4,154,100, entitled METHOD AND APPARATUS FOR STABILIZING THE FLOW COEFFICIENT FOR PITOT-TYPE FLOWMETERS WITH A DOWNSTREAM-FACING PORT. This design includes a forward facing tube which measures total pressure ($P_{TOT}$). A second tube measures a down stream pressure. The differential pressure between the two tubes is proportional to the square of the flow as given in Equation 2.

$$Q = NKD^2 Y_1 \sqrt{\rho h} \qquad \text{Equation 2}$$

where:
N=Units conversion factor
K=flow coefficient of the averaging pitot (dimensionless)
D=Pipe diameter (inches)
$Y_1$=Gas expansion factor (dimensionless)
$\rho$=Gas density ($lb_m/ft^3$)
h=Differential pressure (inches $H_2$)

Accurate calculation of flow based upon pressure measurement requires accurate measurement of static pressure in order to determine density ($\rho$) and the gas expansion factor ($Y_1$) for use in Equation 1. However, the additional sensor to sense static pressure ($P_{STAT}$) in the prior art is cumbersome, inconvenient, expensive and provides an additional source of errors.

SUMMARY

A process transmitter for measuring a process variable of a process fluid through a vessel includes first and second pressure couplings arranged to receive a first pressure and a second pressure of process fluid in the vessel. These pressures are related to density of the process fluid. A secondary sensor provides a secondary output related to a process variable of process fluid through the vessel. Measurement circuitry is configured to calculate a calculated process variable of the process fluid through the vessel based upon the first and second pressures and the secondary output.

DETAILED DESCRIPTION

In industrial processes, it is frequently desirable to measure a process variable which is related to the density of a process fluid for both monitoring and control applications. Mass flow and product level measurements are two such process variables. In control of chemical reactions, mass balancing of reactants and balancing of mass flow yields improved product quality control and increases throughput. In reaction to this, many technologies have been developed to measure mass flow. All have some type of limitation. One of the more popular mass flow technologies, the Coriolis meter, for example, is physically large and expensive in larger line sizes. Such meters are typically not available in sizes larger than 6 inches. Another popular technology, Multivariable DP (differential pressure), requires the user to know and enter the equation of state for the product being metered. What is needed is a mass flow meter that is simple to use, scales up in size and does not require knowledge of the equation of state.

The present invention provides a method and apparatus for directly measuring density of the process fluid. Such direct measurement can improve accuracy of level and mass flow measurements while also reducing the computational requirements. Further, such a configuration does not require the user to enter the equation of state for mass flow measurements.

Figure 1:
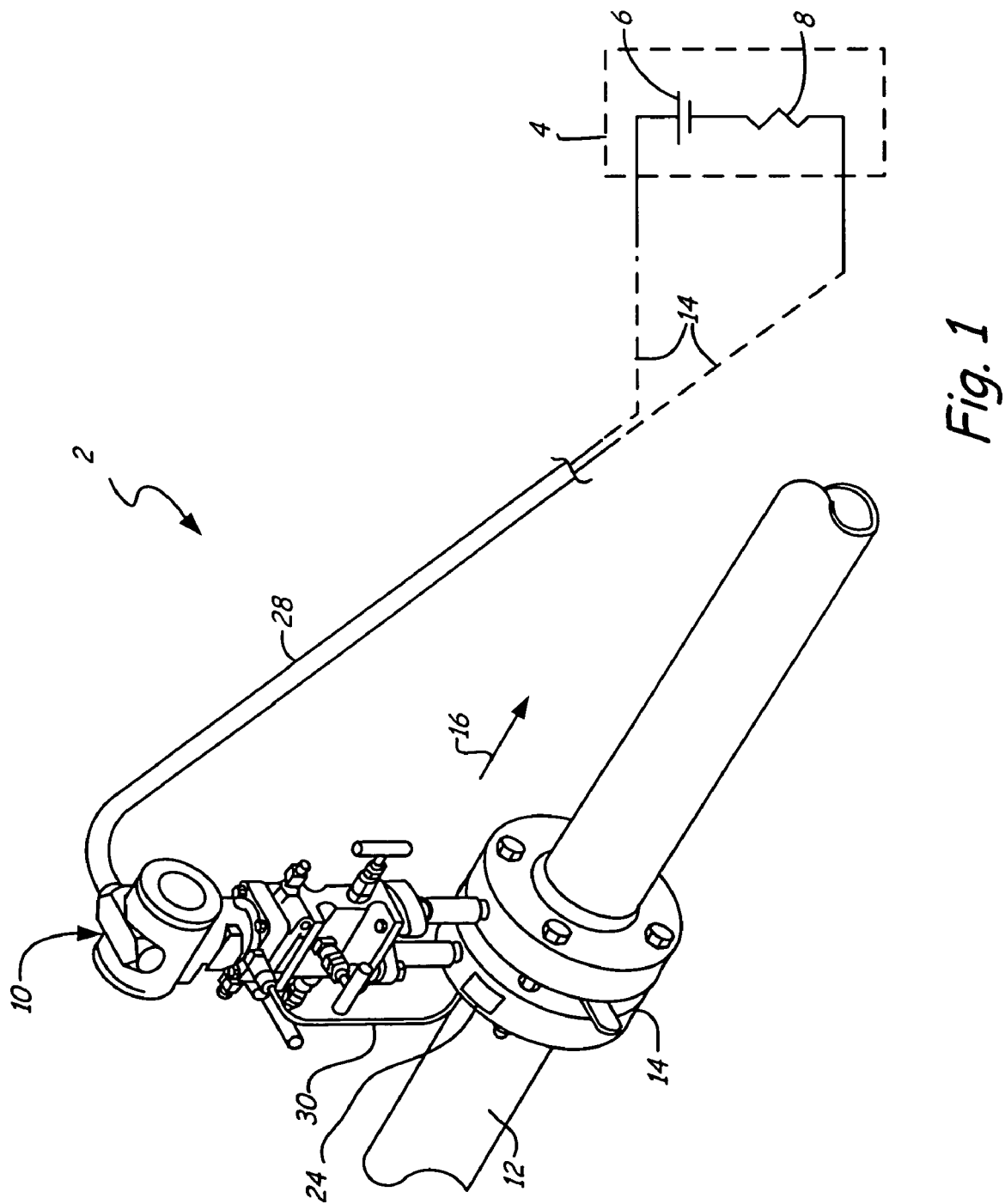
FIG. 1 is a view showing a flow transmitter in accordance with the present invention.

FIG. 1 illustrates a typical environment of a process transmitter, such as flow transmitter 10, of a process measurement or control system 2. Transmitter 10 couples to control room 24 through a process control loop 14 (shown as voltage source 6 and resistance 8). Transmitter 10 is coupled to a process fluid container such as pipe 12 through pipe fitting or flange 14. Pipe 12 conducts flow of a fluid, such as a gas or liquid, in the direction indicated by arrow 16.

In this example, the transmitter 10 provides an output signal indicative of flow of the process fluid flowing through pipe 12 to control room 4 preferably using 4-20 mA two-wire loop 14 preferably formed using twisted pair of conductors through flexible conduit 28. Transmission can be, for example, in accordance with the Highway Addressable Remote Transducer (HART®) protocol, Foundation™ Fieldbus, Profibus or other standards. Alternatively, various wireless techniques may be employed for the process control loop. Flow is determined using known techniques based upon a density determination as discussed below. Differential pressure coupling 24 couples to a differential pressure sensor (now shown in FIG. 1) carried in transmitter 10 through impulse piping 30.

During operation, and as discussed below in more detail, transmitter 10 measures flow of process fluid through piping 12 based upon density of the process fluid and velocity of the process fluid. Density of the process fluid is determined using pressure coupling 24. In the example illustrated in FIG. 1, velocity of the process fluid is determined based upon the differential pressure caused by an obstruction placed in the flow of process fluid. However, the present invention is not limited to such a configuration.

Figure 2:
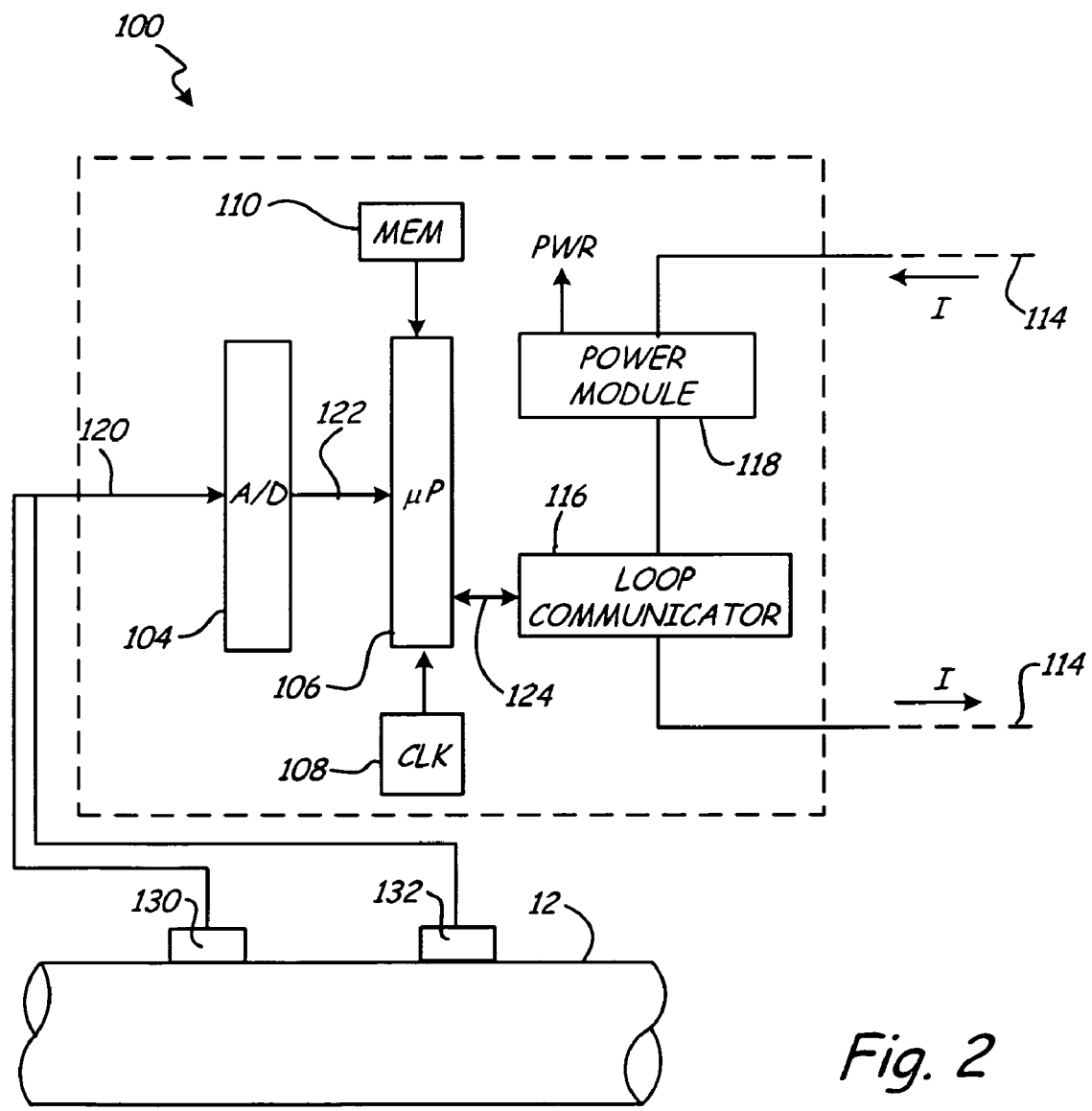
FIG. 2 is a simplified diagram showing a flow transmitter in accordance with the present invention including a sensor for measuring density.

FIG. 2 is a simplified block diagram of a process transmitter 100 which couples to velocity sensor 130 and density sensor 132 (in some embodiments, element 130 and 132 each represent multiple sensors) which may be either internal or external to the housing for transmitter 100. The output 120 from sensors 130 and 132 are digitized by analog to digital converter 104 and provided to a microprocessor 106. Microprocessor 106 operates at a rate determined by clock 108 and in accordance with instructions stored in memory 110. Memory 110 can also store both permanent and temporary variables. Through connection 124, microprocessor 106 couples to a loop communicator 112 which couples to loop 114.

Transmitter 100 is used to measure a process variable. Velocity sensor 130 and density sensor 132 are configured to couple to a process, such as process fluid carried in pipe 12 shown in FIG. 1, and provide sensor outputs 120 to analog to digital converter 104. Analog to digital converter 104 provides a digitized output 122 to microprocessor 106 which provides a process variable output 124 to transmitter output circuitry such as loop communicator 116. The process variable output 124 is a function of the sensor outputs 120.

FIG. 2 is provided for illustrative purposes and actual transmitter configurations can vary. For example, the functions performed by microprocessor 106 can be performed by a number of different microprocessors or circuits. The output from sensor 130 or 132 can be processed prior to its analog to digital conversion by analog to digital converter 104. Additional compensation steps can be performed using digital circuitry. Many functions can be implemented in either hardware or software, or in their combination. The particular configuration set forth in FIG. 2 should not limit the scope of the invention and those skilled in the art will recognize that the configuration can be modified.

As mentioned above, the transmitter couples to process control loop 114. One example of a two-wire process control loop carries a current I which has a minimum value of 4 mA and a maximum value of 20 mA. Data can be transmitted in a digital and/or an analog format. Loop communicator 116 is also used by microprocessor 106 to receive data from loop 114. A power module 118 is used to provide power to components in transmitter 100 using power received from loop 114. In some types of transmitters, the transmitter is completely powered with power received from loop 114.

In FIG. 2, velocity sensor 130 and density sensor 132 are shown. The density sensor 132 can couple to process piping 12 using, for example, coupling 24 shown in FIG. 1. Velocity sensor 130 can be any type of sensor arrangement used to sense or measure the velocity of the process fluid through piping 12. Examples include differential pressure based technologies including those based upon measurement of a differential pressure across an obstruction or a pitot tube, Coriolis based technologies and in which Coriolis disturbances in the flow are used to measure velocity, magnetic flowmeter based technologies in which a magnetic field is applied to the process fluid and a resultant electrical potential is measured in order to determine flow, or any other appropriate technology.

The density sensor 132 is described below in more detail and provides an output related to density of the process fluid based upon a differential pressure as sensed between two vertically offset locations in the process piping 12. The weight of the process fluid in piping 12 causes this differential pressure.

Figure 3:
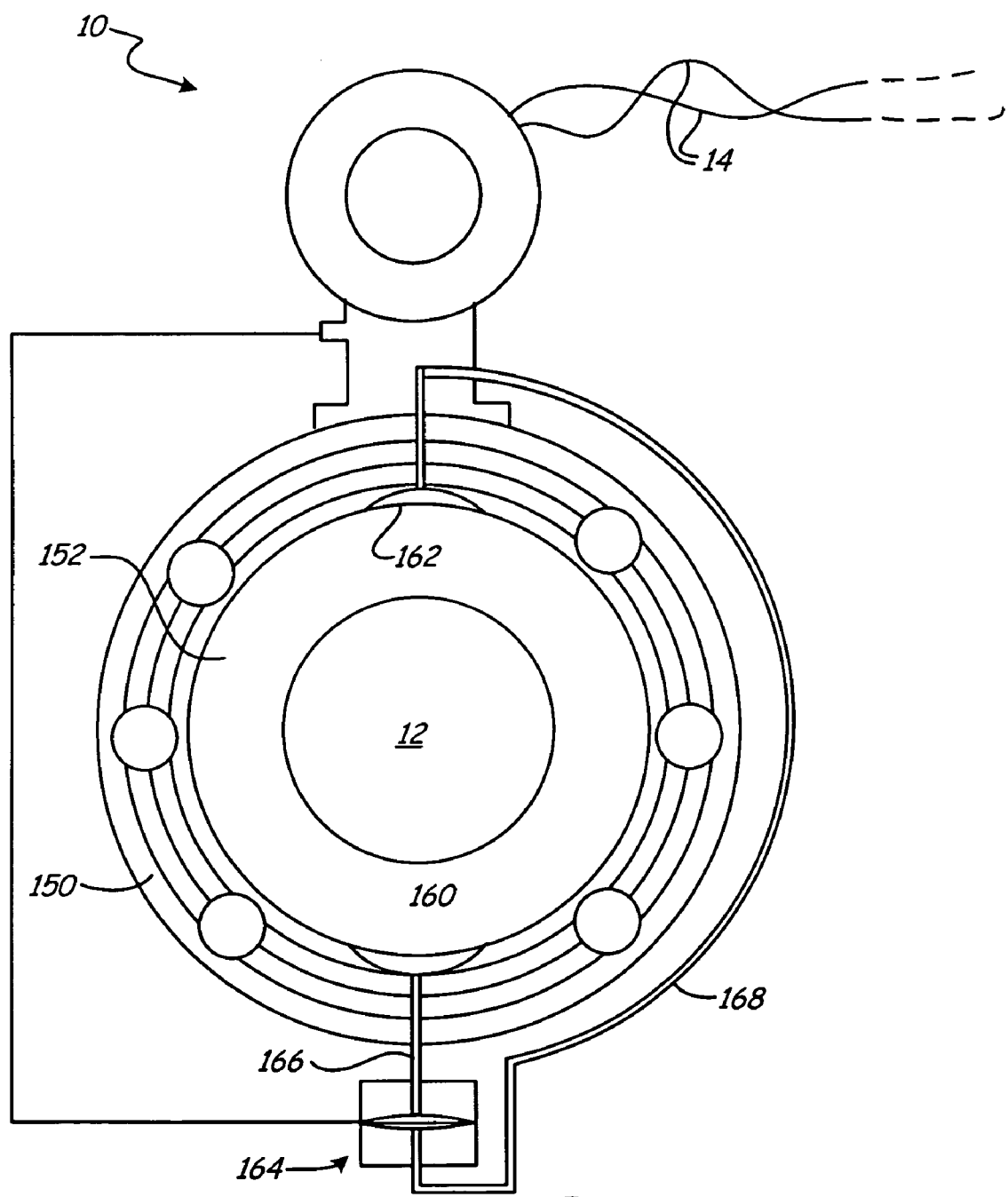
FIG. 3 is a front cross sectional view of process piping shown in FIG. 1.
Figure 4:
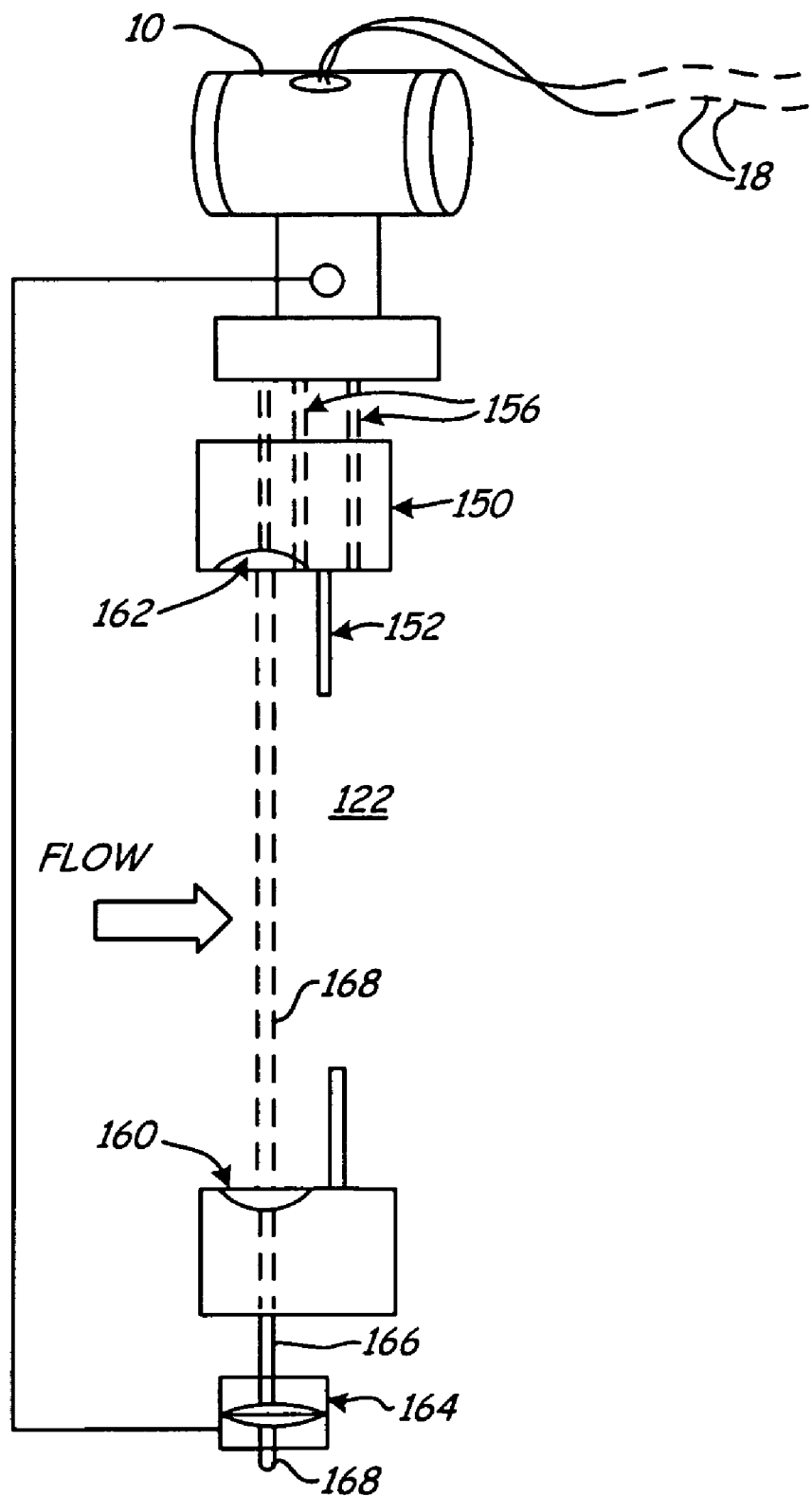
FIG. 4 is a side cross sectional view of process piping shown in FIG. 1.

FIG. 3 is a front cross sectional view and FIG. 4 is a side partial cutaway view of flow transmitter 10. In the embodiment illustrated in FIGS. 3 and 4, a mounting flange 150 is used to couple the transmitter 10 into the process piping 12 and an orifice plate 152 is positioned within the mounting flange 150 to create a differential pressure as the process fluid flows through the orifice. In FIG. 4, impulse piping 156 couple pressure on either side of orifice plate 152 to a differential pressure sensor 204 (shown in FIG. 5) carried within transmitter 10.

In addition to measuring the differential pressure across orifice plate 152 using sensor 204 (see FIG. 5), the transmitter 10 is further configured to measure a differential pressure caused by the weight of the process fluid due to a vertical offset within process piping 12. Isolation diaphragms 160 and 162 are arranged at the bottom and top, respectively, of process pipe 12. A differential pressure sensor 164 is coupled between diaphragm 160 and 162 through impulse piping 166 and 168, respectively. Impulse piping 166 and 168 are filled with an isolation fill fluid such as substantially incompressible oil. The two isolation diaphragms 160 and 162 are positioned on the high side (upstream side) of the differential pressure producer 152. As the fluid in the pipe passes over the lower seal, the weight (or mass) of the fluid imparts a force on the diaphragm 160 which is measured directly by a low range differential pressure sensor 164. Further, the upper diaphragm 162 cancels out the line pressure within process piping 12 and is applied to an opposite side of differential pressure sensor 164. In this way, the density of the process fluid is directly measured based upon the sensed pressure and the diameter of process piping 12. This density is then used in standard mass flow equations such as those discussed above to calculate mass flow of the process fluid. For example, in the case of a hydrocarbon liquid with a specific gravity of 0.8 flow and where the diameter of the piping 12 is 6 inches, the measured differential pressure for density purposes will be about 4.8 inches w.c. (water column). A pressure sensor having a low range can provide 0.1% of span accuracy at this range thereby allowing an accurate determination of fluid density.

In FIGS. 3 and 4, a differential pressure sensor 164 is illustrated based upon a deflectable center diaphragm. The deflection of the diaphragm can be measured by measuring the relative capacitance between the diaphragm and the side walls of the pressure sensor using known techniques. However, any appropriate pressure measurement technique can be used and the invention is not limited to the deflectable diaphragm configuration. Further, in FIGS. 3 and 4, the pressure transmitter 10 is illustrated as a unitary assembly. However, in another example configuration, a separate transmitter is used to measure the density of the process fluid based upon differential pressure. Similarly, the differential pressure measurement used for measuring density can be taken anywhere along process piping 12 and the measurement is not required to be taken in close proximity to the orifice plate 152. In such a configuration, the measurement may need to be compensated. Further, as discussed above, any type of fluid velocity measuring technique can be used and the invention is not limited to the illustrated technique based upon differential pressure across a flow restriction.

In the configuration of FIGS. 3 and 4, the placement of the low range differential pressure sensor 164 must be such that the volume between the oil in capillary tubes 166 and 168 is balanced. However, if the oil is not balanced (for example, as illustrated in FIGS. 3 and 4), the difference can be adjusted, for example, in software within transmitter 10. This adjustment can be performed, for example, during a calibration of the transmitter 10.

Figure 5:
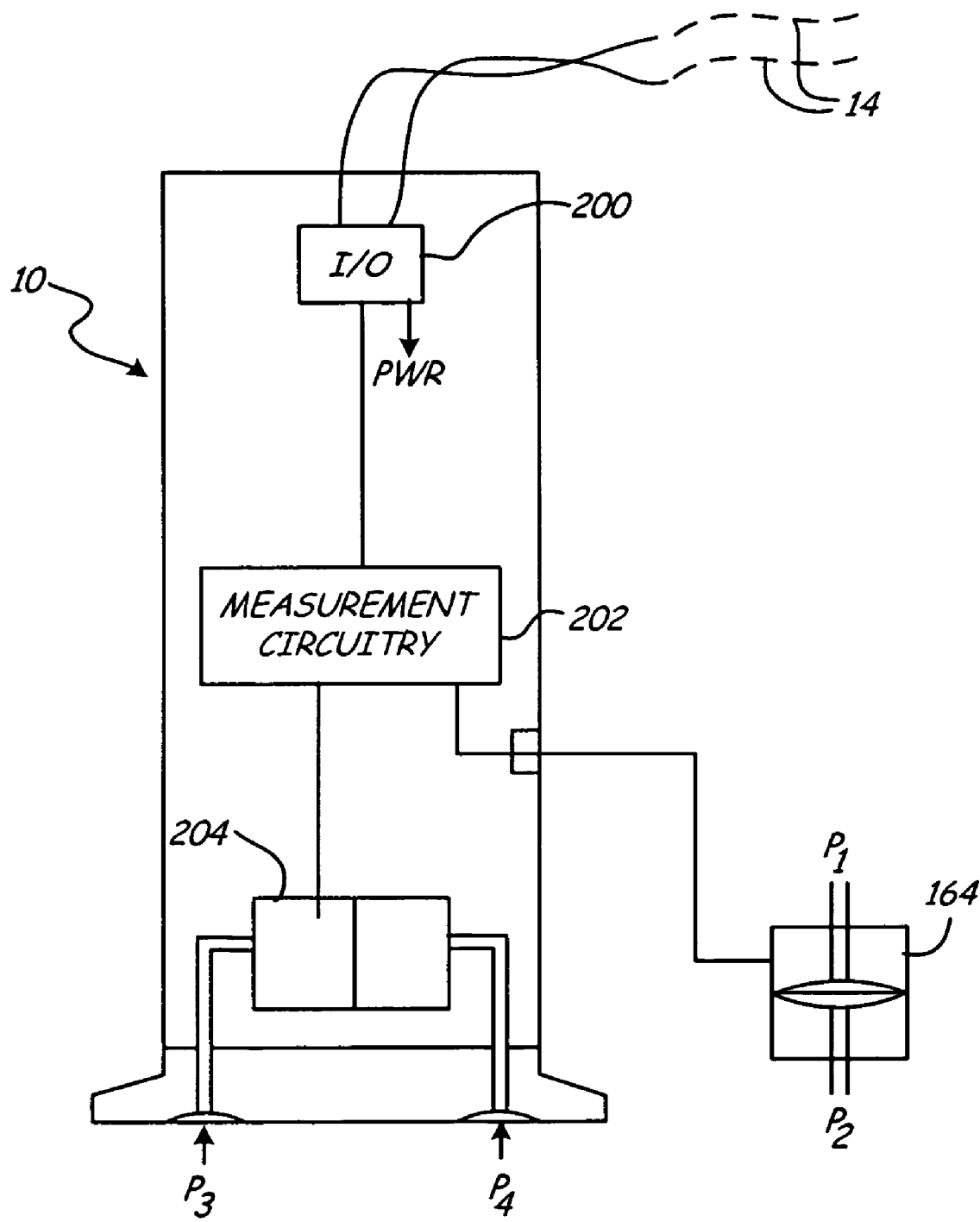
FIG. 5 is a simplified diagram showing a transmitter for measuring flow based upon a density measurement derived from a differential pressure.

FIG. 5 is a simplified cross sectional view of transmitter 10. In FIG. 5, transmitter 10 is shown as including I/O circuitry 200 which is used for communicating over process control loop 14. In some configurations, I/O circuitry 200 also provides a power output used to provide power to transmitter 10. Measurement circuitry 202 couples to differential pressure sensor 164 and differential pressure sensor 204. Differential pressure sensor 164 is discussed above and is used to measure a differential pressure related to density of the process fluid. The differential pressure is based upon the difference between pressures $P_1$ and $P_2$ applied to opposite sides of the pressure sensor 164. Differential pressure sensor 204 is configured to measure the differential pressure generated across the orifice plate 152 illustrated in FIGS. 3 and 4. As discussed above, based upon the two differential pressures (the differential pressure between $P_1$ and $P_2$ and the differential pressure between $P_3$ and $P_4$), measurement circuitry 202 determines mass flow of the process fluid through process piping 12 based upon a density calculation derived from $P_1$ and $P_2$.

Figure 6:
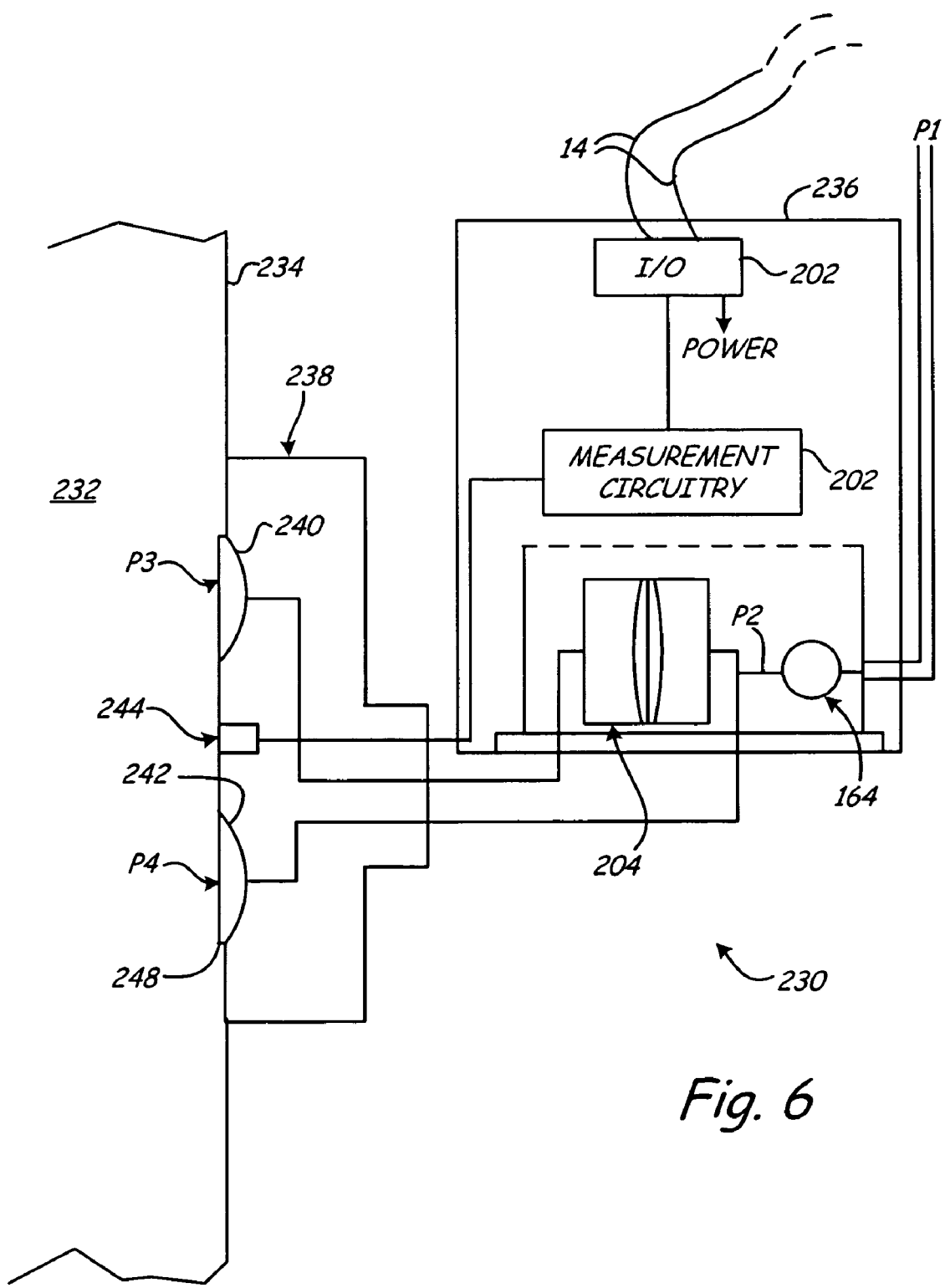
FIG. 6 is a side cross sectional view showing the level measurement configuration.

FIG. 6 is a block diagram view of another embodiment of the present invention in which the system 230 is provided for measuring the level of process fluid 232 in a vessel 234 such as a tank. Process variable transmitter 236 couples to tank through process coupling 238. Transmitter 236 includes measurement circuitry 202, differential pressure sensor 204 and pressure sensor 164 configured to sense a gauge pressure. A dorsal isolator 240 is configured to receive a pressure $P_3$ and a ventral isolator 242 is configured to receive pressure $P_4$. A temperature sensor 244 is provided for sensing temperature of process fluid 232. In the configuration of FIG. 6, pressure sensor 164 receives a pressure input $P_2$, which is the same as pressure $P_4$, and a pressure input $P_1$ (typically $P_1$ is a tube connected to tank ullage).

Various types of remote seal configurations are used to measures liquid level in tanks. The remote seal resents a standardized large face to the process and is typically held in place via a flange. These seal systems are typically used to measure a single process variable, liquid head. In some transmitters, software is used to provide tank shape which together with liquid head can provide the level of the product in units of length, or product volume is units of volume. Such remote seal systems can be used in either atmospheric tanks or closed tanks. However, there are many variation of such remote seal configurations. In one aspect, the present invention uses the capabilities discussed above to measure multiple variables in order to determine density for level measurements.

As illustrated in FIG. 6, process coupling 238 couples to tank 234 and provides a coupling for transmitter 236 to measure pressures $P_3$ and $P_4$. The gauge pressure sensor 164 is coupled to pressure $P_4$ and into pressure $P_1$. Pressure $P_1$ can be, for example, vented to atmosphere in the case of a vented tank or vessel, or in the case of a blanketed tank, plumbed to the tank. The differential pressure sensor tool for should be a sensor configured to measure a relatively low pressure range. Using this configuration, measurement circuitry 202 can measure product density using the hydrostatic equation (TH-PL)/d or DP/d where d is the distance between isolators 240 and 242 and DP is the differential pressure between. Note that such a measurement only provides the density of the process fluid between the two isolators. However, in many applications, the product density does not stratify over the height of the tank. The liquid head (LH) is measured directly by the gauge pressure sensor 164. Using this information, measurement circuitry 202 can determine level using the equation LH/density. Product volume can be calculated by multiplying the level of determination by the tank area. In one embodiment, temperature sensor 244 measures temperature and can be used to determine standard volume and standard density.

Figure 7:
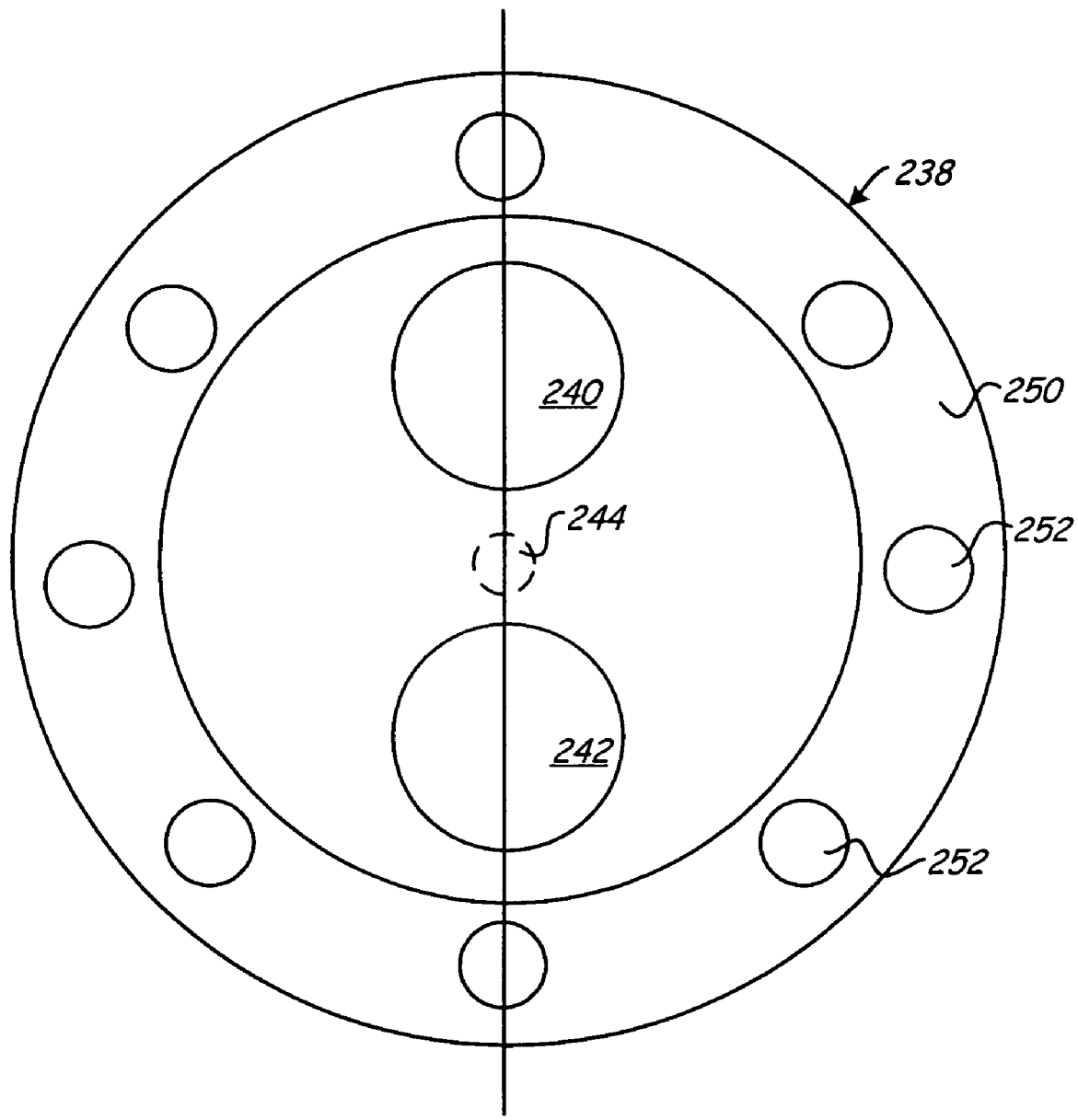
FIG. 7 is a front plan view of a coupling of FIG. 6.

FIG. 7 is a front plan view of process coupling 238. Coupling 238 can be configured to fit in a single opening 248 as shown in FIG. 6. A seal 250 extends around a coupling 238 which includes bolt holes 252 for mounting onto tank 234.

Although FIG. 6 illustrates transmitter 236 as being positioned adjacent coupling 238, the two components can be separated and coupled using impulse piping. Additionally, a system using two isolators can be employed.

Although the present invention has been described with reference to preferred embodiments, workers skilled in the art will recognize that changes may be made in form and detail without departing from the spirit and scope of the invention. Any process variable can be determined including volumetric and mass flow rate, liquid head, etc. Although the pressure couplings for the differential pressure used to determine density are shown at the top and bottom of the process vessel, other arrangements can be utilized. For example, the isolation diaphragms can be offset from the top and bottom locations and calibrated accordingly. The calibration can be through characterizing equations or through direct calibration measurements.

What is claimed is:

1. A process variable transmitter for measuring a process variable of a process fluid in a vessel, comprising;

first and second pressure couplings arranged to receive a first pressure and a second pressure of process fluid in the vessel wherein a difference between the first pressure and the second pressure is related to weight of the process fluid;

a sensor having a sensed process variable output related to the process fluid in the vessel; and measurement circuitry configured to calculate a calculated process variable of the process fluid in the vessel based upon density of the process fluid determined as a function of weight of the process fluid measured by the first and second pressures and the sensed process variable.

2. The apparatus of claim 1 wherein the sensor comprises a differential pressure sensor.

3. The apparatus of claim 1 wherein the measurement circuitry determines volumetric flow rate of the process fluid.

4. The apparatus of claim 1 wherein the measurement circuitry determines a mass flow rate of the fluid.

5. The apparatus of claim 2 wherein the sensor includes a differential pressure generator.

6. The apparatus of claim 5 wherein the differential pressure generator comprises an orifice plate.

7. The apparatus of claim 1 wherein the first and second pressures are coupled to a differential pressure sensor which provides a differential pressure output to the measurement circuitry.

8. The apparatus of claim 1 wherein the first pressure coupling is positioned adjacent the bottom of the vessel and the second pressure coupling is positioned adjacent a top of the vessel.

9. The apparatus of claim 8 wherein the vessel comprises a pipe and the pipe includes a restriction with the first and second pressure couplings positioned adjacent the restriction.

10. The apparatus of claim 1 wherein the first and second pressure couplings include isolation diaphragms configured to isolate a pressure sensor from the process fluid.

11. The apparatus of claim 8 including a differential pressure sensor configured to measure a differential pressure between the first and second pressure couplings.

12. The apparatus of claim 11 wherein the differential pressure sensor is positioned outside of a housing of the process variable transmitter.

13. The apparatus of claim 1 wherein the sensor senses an electric potential induced in the process fluid due to an applied magnetic field.

14. The apparatus of claim 1 wherein the first and second pressure coupling are carried in a unitary flange configured to mount to the process vessel.

15. The apparatus of claim 1 wherein the measurement circuitry is configured to measure level of a process fluid based upon the density measurement.

16. The apparatus of claim 15 wherein the sensor measures liquid head.

17. The apparatus of claim 15 wherein the calculated process variable is further a function of a measured temperature.

18. A method for measuring a process variable of a process fluid in a vessel, comprising:

sensing a process variable of the process fluid in the vessel;

measuring weight of the process fluid using a differential pressure;

calculating density of the process of the density based upon the measured weight; and calculating a calculated process variable of the process fluid based upon the measured process variable and the calculated density.

19. The method of claim 18 including generating a differential pressure in a flow of process fluid.

20. The method of claim 19 wherein the differential pressure is generated using an orifice plate.

21. The method of claim 20 wherein the differential pressure is measured using a process coupling configured to couple to an upper and lower process pressure.

22. The method of claim 18 wherein calculating a process variable comprises calculating mass flow.

23. The method of claim 18 wherein calculating a process variable comprises calculating level of a process fluid.

24. The apparatus of claim 18 wherein calculating a calculated process variable includes measuring a temperature of the process fluid.

* * * * *

UNITED STATES PATENT AND TRADEMARK OFFICE
CERTIFICATE OF CORRECTION

PATENT NO. : 7,461,562 B2
APPLICATION NO. : 11/511584
DATED : December 9, 2008
INVENTOR(S) : Mark S. Schumacher It is certified that error appears in the above-identified patent and that said Letters Patent is hereby corrected as shown below:

Under (56) References Cited page 2,
FOREIGN PATENT DOCUMENTS
Change "WO    WO 98/04089   5/1989" to
--WO    WO 89/04089   5/1989--

Signed and Sealed this

Eighth Day of June, 2010

David J. Kappos
*Director of the United States Patent and Trademark Office*